(12) United States Patent
Jiang

(10) Patent No.: US 12,307,632 B2
(45) Date of Patent: May 20, 2025

(54) SYSTEMS, METHODS, AND COMPUTER PROGRAMS FOR A MICROSCOPE AND MICROSCOPE SYSTEM

(71) Applicant: Leica Instruments (Singapore) Pte. Ltd., Singapore (SG)

(72) Inventor: Yifan Jiang, Heerbrugg (CH)

(73) Assignee: Leica Instruments (Singapore) Pte. Ltd., Singapore (SG)

( * ) Notice: Subject to any disclaimer, the term of this patent is extended or adjusted under 35 U.S.C. 154(b) by 361 days.

(21) Appl. No.: 17/905,844

(22) PCT Filed: Mar. 8, 2021

(86) PCT No.: PCT/EP2021/055721
§ 371 (c)(1),
(2) Date: Sep. 8, 2022

(87) PCT Pub. No.: WO2021/180616
PCT Pub. Date: Sep. 16, 2021

(65) Prior Publication Data
US 2023/0368348 A1 Nov. 16, 2023

(30) Foreign Application Priority Data

Mar. 11, 2020 (EP) ..................................... 20162536

(51) Int. Cl.
*G06T 5/50* (2006.01)
*G06T 7/246* (2017.01)
(52) U.S. Cl.
CPC ................ *G06T 5/50* (2013.01); *G06T 7/246* (2017.01); *G06T 2207/10056* (2013.01); *G06T 2207/30024* (2013.01)
(58) Field of Classification Search
CPC . G06T 5/50; G06T 7/246; G06T 2207/10056; G06T 2207/30024
See application file for complete search history.

(56) References Cited

U.S. PATENT DOCUMENTS

| 7,359,563 B1 * | 4/2008 | Dua ......................... G06T 5/73 |
| | | 382/254 |
| 2005/0163348 A1 | 7/2005 | Chen |
| | (Continued) | |

OTHER PUBLICATIONS

B. D. Lucas and T. Kanade, "An Iterative Image Registration Technique with an Application to Stereo Vision," IJCAI, 1981.
(Continued)

*Primary Examiner* — Quang N Vo
(74) *Attorney, Agent, or Firm* — 2SPL Patent Attorneys PartG mbB; Kieran O'Leary

(57) ABSTRACT

Examples relate to systems, methods and computer programs for a microscope, and to a microscope system comprising such as system. The system for the microscope comprises one or more processors and one or more storage devices. The system is configured to obtain image data from an optical imaging sensor of the microscope. The image data comprises at least a first frame and a subsequent second frame. The system is configured to determine a plurality of points of the first frame and a corresponding plurality of points of the second frame. In some embodiments, the plurality of points are selected from a portion of the image data showing an illuminated portion of an object being shown in the image data. The system is configured to determine a plurality of offsets between the plurality of points of the first frame and the corresponding plurality of points of the second frame. In various embodiments, the system is configured to determine a group of similar offsets from the plurality of offsets. In this case, the system is configured to estimate a motion of the optical imaging sensor based on the group of similar offsets. Alternatively, the motion of the optical imaging sensor may be estimated directly based on the plurality of offsets. The system is configured to adjust the image data based on the estimated motion.

15 Claims, 6 Drawing Sheets

(56) References Cited

U.S. PATENT DOCUMENTS

| | | |
|---|---|---|
| 2006/0274156 A1 | 12/2006 | Rabbani et al. |
| 2012/0218427 A1* | 8/2012 | Wu .................... H04N 23/6811 |
| | | 348/208.6 |
| 2018/0172971 A1 | 6/2018 | Zhou |
| 2019/0302442 A1 | 10/2019 | Sugie et al. |

OTHER PUBLICATIONS

J.-Y. Bouguet, "Pyramidal implementation of the Lucas Kanade feature tracker," Intel Corporation, 2001.

M. Ester, K. Hans-Peter, S. Jorg and X. Xu, "A density-based algorithm for discovering clusters a density-based algorithm for discovering clusters in large spatialdatabases with noise," KDD'96 Proceedings of the Second International Conference on Knowledge Discovery and Data Mining, pp. 226-231 , 1996.

* cited by examiner

SYSTEMS, METHODS, AND COMPUTER PROGRAMS FOR A MICROSCOPE AND MICROSCOPE SYSTEM

TECHNICAL FIELD

Examples relate to systems, methods and computer programs for a microscope, and to a microscope system comprising such as system.

BACKGROUND

Digital neurosurgical microscope systems generally comprise an optics carrier (i.e. the actual surgical microscope), which is suspended by a mechanical arm system. The optics carrier often comprises digital image acquisition devices, which acquire the surgical scene in real time and present it to the surgeons on a monitor or a digital viewer. When the arm system is perturbed, the vibration of the arm is transmitted to the optics carrier, resulting in a vibrating scene in the field of view.

Vibrations in the digital video stream can be suppressed either mechanically or digitally. The mechanical suppression of vibration reduces the amplitude and increases the decay rate of the vibrations in the arm system, resulting in less intense motion of the optics carrier. Since the optics carrier moves less, the scene in the resulting digital video also remains stable. This is generally achieved by improving the mechanical design of the arm system and/or increasing the amount of damping in movable parts. The digital vibration suppression, also known as digital video stabilization, leverages image processing techniques to post-process the digital video stream and removes the residual vibrations in the video.

Mechanical vibration suppression is in general difficult and expensive to implement. It implies the arm system is either redesigned or intensively modified, resulting in increased complexity and time-to-market.

Existing digital video stabilization algorithms are not directly applicable to digital neurosurgical microscopes because of the distinctive characteristics of the surgical scene which neurosurgical microscopes usually see. First, objects in the scene have complex shapes and diverse textures, making it difficult for the algorithms to detect motion in the scene. Second, objects in the scene have complex motion trajectories, making it difficult to extract the motion which results from the actual motion of the camera. Third, the scenes usually have low depth, which implies that only a small portion remains in focus while the rest of the scene appears blurry. Due to these characteristics, other digital video stabilization algorithms, which are designed for general everyday scenes, give suboptimal performance under typical neurosurgical scenes. Previous approaches for video stabilization are often costly to implement and not directly applicable to digital neurosurgical microscopes.

SUMMARY

There may be a desire to provide an improved concept for suppressing vibration in video image data of a digital neurosurgical microscope in real time at low cost.

This desire is addressed by the subject matter of the independent claims.

Embodiments of the present disclosure are based on the finding, that the distinct characteristics of video in surgical microscopes can be exploited to provide an improved vibration reduction in image data of video of a microscope. For once, at least some embodiments use an approach for filtering out "noise" in the digital vibration reduction, by generating motion vectors (i.e. "offsets") between points on two frames, grouping similar motion vectors, and using the group to perform the digital vibration reduction, thereby discarding motion vectors that are likely to be erroneously calculated, or motion vectors that belong to a moving object, such as a hand or a scalpel. Alternatively or additionally, video image data of a microscope may have a typical illumination characteristic, with the video showing a bright circle in the middle and the brightness rapidly falling off towards the sides. At least some embodiments use brightly illuminated portions of the image data, which are also likely in focus, to perform digital vibration reduction.

Various embodiments of the present disclosure provide a system for a microscope. The system comprises one or more processors and one or more storage devices. The system is configured to obtain image data from an optical imaging sensor of the microscope. The image data comprises at least a first frame and a subsequent second frame. The system is configured to determine a plurality of points of the first frame and a corresponding plurality of points of the second frame. The system is configured to determine a plurality of offsets between the plurality of points of the first frame and the corresponding plurality of points of the second frame. The system is configured to determine a group of similar offsets from the plurality of offsets. The system is configured to estimate a motion of the optical imaging sensor based on the group of similar offsets. The system is configured to adjust the image data based on the estimated motion. By grouping similar offsets, other offsets that are not part of the group of similar offsets, and which may be caused by noise or by objects moving between the frames, may be ignored, leading to an improved digital vibration compensation.

The system may be configured to cluster the plurality of offsets into a plurality of groups of offsets using a clustering algorithm, such that each group of offsets comprises one or more offsets that are similar according to a similarity criterion. The system may be configured to determine the group of similar offsets among the plurality of groups of offsets. For example, one of the groups of offsets may be based on the general movement of the optical imaging sensor of the frame, while another group may be based on a movement of an object relative to the general movement of the optical imaging sensor.

For example, the system may be configured to determine the group of similar offsets by selecting a group of offsets of the plurality of offsets being larger than other groups of offsets of the plurality of groups of offsets. The largest group is likely the group being (exclusively) based on the motion of the optical imaging sensor.

In some embodiments, the clustering algorithm is one of a gaussian mixture algorithm and a density-based spatial clustering algorithm. Both clustering algorithms provide an adequate clustering (i.e. grouping) of offsets.

In various embodiments, the system is configured to determine an offset that represents the group of similar offsets. The system may be configured to adjust the image data based on the determined offset. For example, the image data may be corrected (e.g. shifted) based on the determined offset.

In general, the system may be configured to compensate for the estimated motion of the optical imaging sensor within the adjusted image data. This may provide an improved viewing experience of the adjusted image data by a surgeon.

The system may be configured to obtain the image data over a plurality of frames of the image data. The system may be configured to estimate the motion of the optical imaging sensor over the plurality of frames. The system may be configured to adjust the image data based on the estimated motion of the optical imaging sensor that is calculated over the plurality of frames. By performing the motion estimation over a plurality of frames (e.g. a video), a desired motion of the optical imaging sensor (e.g. due to a surgeon moving the surgical microscope) may be differentiated from an undesired motion of the optical imaging sensor (e.g. due to vibrations).

For example, the system may be configured to low-pass filter the estimated motion of the optical imaging sensor over the plurality of frames. The system may be configured to adjust the image data based on the low-pass filtered estimated motion of the optical imaging sensor. The low-pass filter may extract the desired motion of the optical imaging sensor.

In some embodiments, the system is configured to adjust the image data based on a difference between the estimated motion of the optical imaging sensor and the low-pass filtered estimated motion of the optical imaging sensor. For example, the difference between the two may represent the undesired portion of the motion.

In various embodiments, the plurality of points are selected from a portion of the image data showing an illuminated portion of object being shown in the image data. From the illuminated portion of the object, the generation of the offsets may be more reliable, as the features are more clearly visible, and the illuminated portion is usually in focus.

For example, the microscope is may be surgical microscope. An object being shown in the image data may be a sample of organic tissue of a patient. Embodiments of the present disclosure are particularly suitable for surgical microscopes.

Embodiments of the present disclosure further provide a method for a microscope. The method comprises obtaining image data from an optical imaging sensor of the microscope. The image data comprises at least a first frame and a subsequent second frame. The method comprises determining a plurality of points of the first frame and a corresponding plurality of points of the second frame. The method comprises determining a plurality of offsets between the plurality of points of the first frame and the corresponding plurality of points of the second frame. The method comprises determining a group of similar offsets from the plurality of offsets. The method comprises estimating a motion of the optical imaging sensor based on the group of similar offsets. The method comprises adjusting the image data based on the estimated motion.

Embodiments of the present disclosure further provide another embodiment of a system for a microscope. The system comprises one or more processors and one or more storage devices. The system is configured to obtain image data from an optical imaging sensor of the microscope. The image data comprises at least a first frame and a subsequent second frame. The system is configured to determine a plurality of points of the first frame and a corresponding plurality of points of the second frame. The plurality of points are selected from a portion of the image data showing an illuminated portion of an object being shown in the image data. The system is configured to determine a plurality of offsets between the plurality of points of the first frame and the corresponding plurality of points of the second frame. The system is configured to estimate a motion of the optical imaging sensor based on the plurality of offsets. The system is configured to adjust the image data based on the estimated motion.

Embodiments of the present disclosure further provide a method for a microscope. The method comprises obtaining image data from an optical imaging sensor of the microscope. The image data comprises at least a first frame and a subsequent second frame. The method comprises determining a plurality of points of the first frame and a corresponding plurality of points of the second frame. The plurality of points are selected from a portion of the image data showing an illuminated portion of an object being shown in the image data. The method comprises determining a plurality of offsets between the plurality of points of the first frame and the corresponding plurality of points of the second frame. The method comprises estimating a motion of the optical imaging sensor based on the plurality of offsets. The method comprises adjusting the image data based on the estimated motion.

Embodiments of the present disclosure further provide a computer program with a program code for performing at least one of the above methods when the computer program is executed on a processor.

Embodiments of the present disclosure further provide a microscope system comprising the microscope and at least one of the above systems.

SHORT DESCRIPTION OF THE FIGURES

Some examples of apparatuses and/or methods will be described in the following by way of example only, and with reference to the accompanying figures, in which FIG. 1a shows a block diagram of an embodiment of a system for a microscope;

DETAILED DESCRIPTION

Various examples will now be described more fully with reference to the accompanying drawings in which some examples are illustrated. In the figures, the thicknesses of lines, layers and/or regions may be exaggerated for clarity.

Figure 1A:
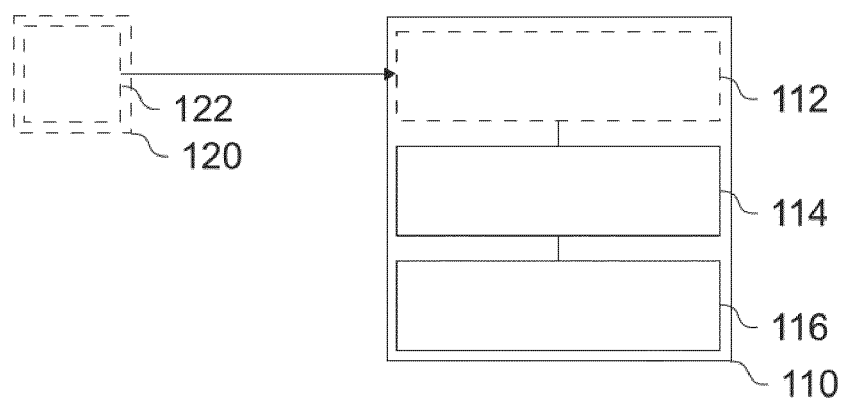
FIG. 1b shows a block diagram of a microscope system.

FIG. 1a shows a block diagram of an embodiment of a system 110 for a microscope 120. The system comprises one or more processors 114 and one or more storage devices 116. As further shown in FIG. 1a, the system 110 optionally comprises an interface 112. The one or more processors 114 are coupled to the interface 112 and to the one or more storage devices. In general, the functionality of the system 110 is provided by the one or more processors 114, e.g. in conjunction with the interface 112 and/or the one or more storage devices 116. For example, the system may be configured to obtain the image data via the interface 112, and/or to provide the adjusted image data via the interface 112, and/or to store the adjusted image data using the one or more storage devices.

The system is configured to obtain image data from an optical imaging sensor 122 of the microscope (e.g. via the interface 112). The image data comprises at least a first frame and a subsequent second frame. The system is configured to determine a plurality of points of the first frame and a corresponding plurality of points of the second frame. In some embodiments, the plurality of points are selected from a portion of the image data showing an illuminated portion of an object being shown in the image data. The system is configured to determine a plurality of offsets between the plurality of points of the first frame and the corresponding plurality of points of the second frame. In some embodiments, the system is configured to determine a group of similar offsets from the plurality of offsets. Accordingly, the system may be configured to estimate a motion of the optical imaging sensor based on the group of similar offsets. Alternatively, if a group of similar offsets has not been determined, the system may be configured to estimate the motion of the optical imaging sensor based on the (entire) plurality of offsets. The system is configured to adjust the image data based on the estimated motion.

Figure 1B:
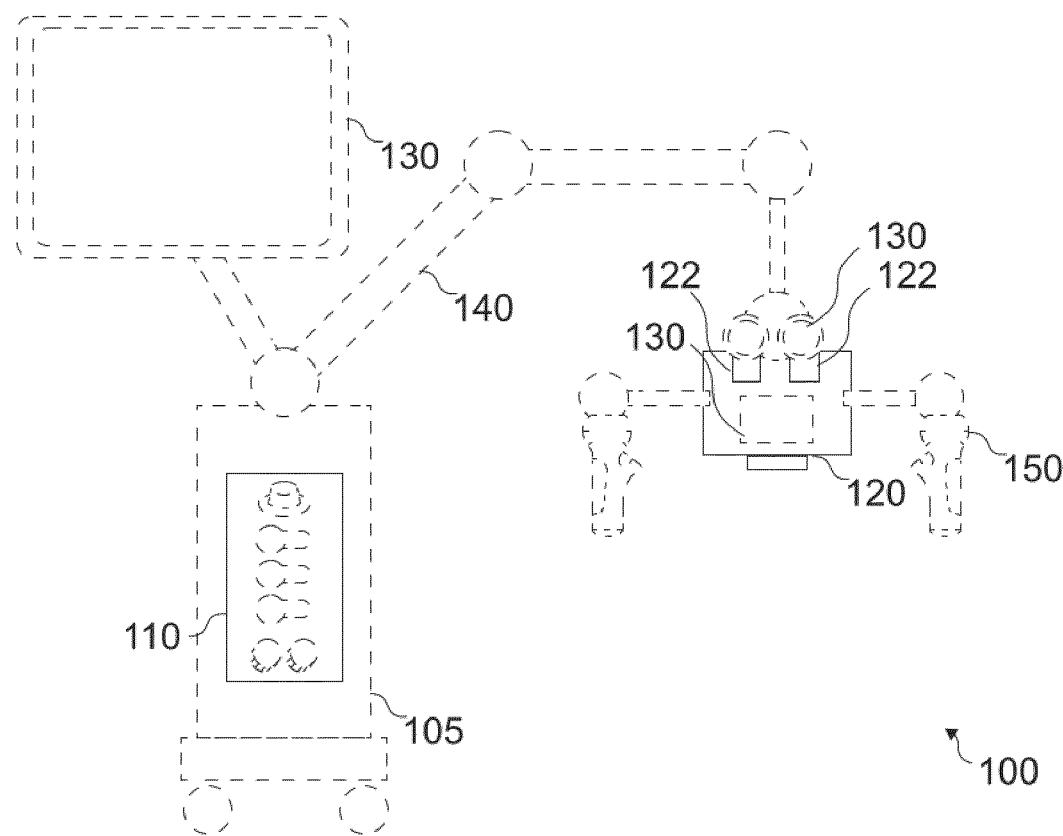

Embodiments of the present disclosure relate to a system, method and computer program for a microscope. In general, a microscope is an optical instrument that is suitable for examining objects that are too small to be examined by the human eye (alone). For example, a microscope may provide an optical magnification of a sample. In modern microscopes, the optical magnification is often provided for a camera or an imaging sensor, such as an optical imaging sensor 122 of the microscope 120 that is shown in FIGS. 1a and 1b. The microscope 120 may further comprise one or more optical magnification components that are used to magnify a view on the sample, such as an objective (i.e. lens).

There are a variety of different types of microscopes. If the microscope is used in the medical or biological fields, the object being viewed through the microscope may be a sample of organic tissue, e.g. arranged within a petri dish or present in a part of a body of a patient. For example, the microscope system 100 may be a microscope system for use in a laboratory, e.g. a microscope that may be used to examine the sample of organic tissue in a petri dish. Alternatively, the microscope 120 may be part of a (neuro) surgical microscope system 100, e.g. a microscope to be used during a (neuro)surgical procedure. Such a system is shown in FIG. 1b, for example. Accordingly, an object being viewed through the microscope, and shown in the image data, may be a sample of organic tissue of a patient. Although embodiments are described in connection with a microscope, they may also be applied, in a more general manner, to any optical device.

The above system 110 is suitable for use with the microscope 120, e.g. in a microscope system 100. FIG. 1b shows a block diagram of a microscope system 100 comprising the system 110 and the microscope 120. The microscope system shown in FIG. 1b is a surgical microscope system. However, the system 110 may be used with other microscope systems or optical systems as well. The surgical microscope system 100 shown in FIG. 1b comprises a number of optional components, such as a base unit 105 (comprising the system 110) with a (rolling) stand, one or more displays 130, a (robotic or manual) arm 140 which holds the microscope 120 in place, and which is coupled to the base unit 105 and to the microscope 120, and steering handles 150 that are attached to the microscope 120. One or more of the displays 130 may be part of the microscope 120, e.g. as auxiliary or as ocular displays. In the context of this application, the term "(surgical) microscope system" is used, in order to cover the portions of the system that are not part of the actual microscope (which comprises optical components), but which are used in conjunction with the microscope, such as the display or an illumination system.

Microscopes, and in particular surgical microscopes, are susceptible to undesired vibrations, as, due to the magnification they provide, even the tiniest vibrations are visible to the user. This in particular applies to surgical microscopes, which are usually held above a patient by a manual or robotic arm. Accordingly, such vibrations may be especially visible in image data that is generated by an optical imaging sensor of a (surgical) microscope, as such image data can be shown on a large screen, where even tiny vibrations can be spotted.

The system is configured to obtain image data from the optical imaging sensor 122 of the microscope. For example, the optical imaging sensor 122 may comprise or be an APS (Active Pixel Sensor)—or a CCD (Charge-Coupled-Device)-based imaging sensor. For example, in APS-based imaging sensors, light is recorded at each pixel using a photo-detector and an active amplifier of the pixel. APS-based imaging sensors are often based on CMOS (Complementary Metal-Oxide-Semiconductor) or S-CMOS (Scientific CMOS) technology. In CCD-based imaging sensors, incoming photons are converted into electron charges at a semiconductor-oxide interface, which are subsequently moved between capacitive bins in the imaging sensors by a control circuitry of the imaging sensors to perform the imaging. The system is configured to obtain (i.e. receive or read out) the image data from the optical imaging sensor 122. The image data may be obtained by receiving the image data from the optical imaging sensor 122 (e.g. via the interface 112), by reading the image data out from a memory of the optical imaging sensor (e.g. via the interface 112), or by reading the image data from a storage device 116 of the system 110, e.g. after the image data has been written to the storage device 116 by the optical imaging sensor 122 or by another system or processor.

As has been laid out before, the image data comprises at least a first frame and a subsequent second frame. Consequently, the image data may be image data comprising a plurality of frames occurring subsequently, e.g. video image data. For example, in video image data, the plurality of frames occurring subsequently may form the video. Accordingly, the system may be configured to obtain the image data over a plurality of frames of the (video) image data. Within the video image data, the frames may adhere to a temporal order. For example, the second frame may occur after the first frame within the (video) image data. In general, however, the frames do not have to be directly subsequent frames of the image data. For example, in order to provide a real-time video stabilization, every n-th frame may be considered as first and second frame, e.g. every second frame, every third frame, every fourth frame, every sixth frame etc.

The system is configured to determine a plurality of points of the first frame and a corresponding plurality of points of the second frame. The order of the selection process may depend on the implementation. For example, in some embodiments, the system may be configured to first select the plurality of points of the first frame, and subsequently detect the corresponding plurality of points within the second frame. Alternatively, the points may be selected in reverse. For example, the system may be configured to first select the plurality of points of the second frame, and subsequently detect the corresponding plurality of points within the first frame. In any case, for the frame being processed first, the system may be configured to select the plurality of points of the first frame or of the second frame using a (two-dimensional) grid or array, and to detect the corresponding plurality of points within the respective other frame. In other words, the determination of the plurality of points of the first frame, or of the plurality of points of the second frame, may be based on a (two-dimensional) grid or array spanning at least a portion of the respective frame. Any which order, the plurality of points of the first frame and the plurality of points of the second frame correspond to each other, i.e. the plurality of points within both frames denote the same plurality of locations of the object being represented by the image data. In other words, the plurality of points of the first frame tag a plurality of positions (or portions) of the object being shown in the image data, and the plurality of points of the second frame may mark the same plurality of positions (or portions) of the object being shown in the image data, e.g. bar points that are falsely determined at the first or second frame. The system may use an image processing algorithm to detect the corresponding plurality of points, e.g. based on at least one of a brightness, a color, a visible feature, or a contrast vis-à-vis adjacent portions of the frames. For example, the Lucas-Kanade optical flow algorithm (as will be introduced below) may be used to determine the plurality of points of the first frame and the corresponding plurality of points of the second frame.

In various embodiments, only a portion of the respective frames might be used to select the plurality of points. For example, in image data generated by an optical imaging sensor of a microscope, in general, only a portion of the frame is brightly illuminated. In surgery, this is a portion of a surgical site that the surgery is being performed on. Other portions of the respective frames may be less brightly illuminated, e.g. peripheral portions of the frames. In some embodiments, only the brightly illuminated portions of the frames may be used to select the plurality of points. In other words, the plurality of points may be selected from a portion of the image data showing an illuminated portion of the object being shown in the image data.

In general, the portion of the image data showing an illuminated portion of the object being shown in the image data may be located at a center of the frames. In some embodiments, other portions of the image data outside the illuminated portion of the object being shown in the image data might not be used for the determining of the plurality of points.

Once the plurality of points are determined for both frames, an offset between corresponding points may be determined. In general, each offset represents a motion of a location of a position or portion of the object being shown in the image data in-between the two image frames. In the context of the present disclosure, the terms "offset", "motion vector" and "velocity vector" may be used interchangeably. For example, the offset or motion vector may be an offset or motion vector that represents two directions. For example, each frame may be represented by a two-dimensional grid of pixels, with the two dimensions defining an x-axis or x-direction, and a y-axis or y-direction. In other words, the image data may be two-dimensional image data. Each offset may comprise an x-direction component (i.e. an offset in x-direction) and a y-direction component (i.e. an offset in y-direction). Accordingly, each motion vector may represent motion in two directions, x and y. The system is configured to determine the plurality of offsets between the plurality of points of the first frame and the corresponding plurality of points of the second frame. In other words, each offset of the plurality of offsets is determined between a point of the plurality of points of the first frame, and a corresponding point of the plurality of points of the second frame.

In some embodiments, the determined offsets are grouped to filter out noise, and to discard the influence of objects being moved across the object shown in the image data, e.g. a finger or scalpel being moved across the surgical site. The system may be configured to determine a group of similar offsets from the plurality of offsets. This may be done to identify a group of similar offsets that represent the actual motion of the microscope, and to separate that group of similar offsets from the other offsets, such as offsets that are caused by noise (e.g. due to points not corresponding between the image frames) or due to movement of an object shown in the image data (e.g. the finger moving across the surgical site). In other words, the group of similar offsets may (primarily) represent the motion of the optical imaging sensor of the microscope (and not the motion of the object itself).

In general, a clustering algorithm may be used to determine the group of similar offsets. In general, a clustering algorithm is used to group objects in such a way, that the objects of a group are more similar to each other than to those in other groups or those outside the group. In this context, the system may be configured to generate the group of similar offsets such, that the offsets of the group of similar offsets are more similar to each other, than to those outside the group, e.g. those in another group. For example, the system may be configured to cluster the plurality of offsets into a plurality of groups of offsets using a clustering algorithm. For example, as will be introduced below, the Density-Based Spatial Clustering of Applications with Noise (DBSCAN) clustering algorithm may be used to cluster the plurality of offsets into a plurality of groups of offsets. Alternatively, other clustering algorithms may be used, such as the gaussian mixture algorithm for generating gaussian mixture models (a machine-learning algorithm). For example, in more general terms, a machine-learning-based clustering algorithm may be used to cluster the plurality of offsets into a plurality of groups of offsets.

Machine learning may refer to algorithms and statistical models that computer systems may use to perform a specific task without using explicit instructions, instead relying on models and inference. For example, in machine-learning, instead of a rule-based transformation of data, a transformation of data may be used, that is inferred from an analysis of historical and/or training data.

In some cases, such as in the present case, a technique called unsupervised learning may be used to train the machine-learning model. In unsupervised learning, (only) input data might be supplied and an unsupervised learning algorithm may be used to find structure in the input data (e.g. by grouping or clustering the input data, finding commonalities in the data). Clustering is the assignment of input data comprising a plurality of input values into subsets (clusters) so that input values within the same cluster are similar according to one or more (predefined) similarity criteria, while being dissimilar to input values that are included in other clusters. Accordingly, the system may be configured to cluster the plurality of offsets into a plurality of groups of offsets using an unsupervised learning algorithm.

The plurality of offsets may be clustered into a plurality of groups of offsets, such that each group of offsets comprises one or more offsets that are similar according to a similarity criterion. For example, the one or more offsets of a group may be similar according to a distance (e.g. a Euclidian distance) between the offsets/motion vectors. In other words, the similarity criterion may be based on an (Euclidian) distance between the offsets/motion vectors. For example, the distance between the offset in x-direction and the offset in y-direction may be summed up to determine the distance between two offsets, an average may be used, or both x-direction and y-direction may be considered independently.

The system may be configured to determine the group of similar offsets among the plurality of groups of offsets. In other words, the system may be configured to select one of the groups of offsets of the plurality of groups of offsets as group of similar offsets. This selection may be based on the size of the groups. For example, the largest group of offsets may be chosen. In other words, the system may be configured to determine the group of similar offsets by selecting a group of offsets of the plurality of offsets being larger than other groups of offsets of the plurality of groups of offsets. Alternatively, another criterion may be applied, e.g. a distance of the group of offsets relative to a center of the image data.

In some embodiments, the system is configured to estimate the motion of the optical imaging sensor based on the group of similar offsets. For example, as has been mentioned before, the group of similar offsets may represent the motion of the microscope, and the other offsets may represent noise, or motion of the object being shown, or of a finger being moved across the object. Accordingly, the motion of the optical imaging sensor may be estimated by processing the group of similar offsets. For example, the system may be configured to determine an offset that represents the group of similar offsets. For example, the offset that represents the group of similar offset may be an average offset that is calculated based on the offsets of the group of similar offsets, or the offset that represents the group of similar offset may be an offset of the group of similar offsets that is a median offset of the group of similar offsets, i.e. an offset that is located at or near the middle of the group of similar offsets. This offset may be used to estimate the motion of the optical imaging sensor. For example, the motion of the optical imaging sensor may be deemed to correspond to a motion indicated by the offset that represents the group of similar offsets. This offset may subsequently be used to adjust the image data.

Alternatively, in some embodiments, the grouping of the offsets may be foregone, and the motion of the optical imaging sensor may be estimated on the plurality of offsets that have been generated based on the plurality of points that have been selected from a portion of the image data showing an illuminated portion of object being shown in the image data. For example, the motion of the optical imaging sensor may be based on an average or based on a median of the plurality of offsets that have been generated based on the plurality of points that have been selected from a portion of the image data showing an illuminated portion of object being shown in the image data.

As has been introduced above, the system may be configured to obtain the image data over a plurality of frames of the image data. Correspondingly, the motion of the optical imaging sensor may be estimated over the plurality of frames of the image data. When estimating the motion of the optical imaging sensor over a plurality of frames, not only the motion between two subsequent frames may be considered, but also the motion over a longer sequence of frames. For example, a surgeon might move the surgical microscope on purpose, thereby generating a desired motion of the optical imaging sensor (relative to the object being shown in the image data). At the same time, undesired motion (i.e. due to vibration may occur). When processing the image data over a longer period of time, motion smoothing may be performed to take into consideration the desired motion, and to reduce the undesired motion. For example, the system may be configured to low-pass filter the estimated motion of the optical imaging sensor over the plurality of frames. In other words, the estimated motion of the optical imaging sensor may be smoothed by low-pass filtering the estimated motion of the optical imaging sensor. The system may be configured to adjust the image data based on the lowpass filtered estimated motion of the optical imaging sensor.

The system is configured to adjust the image data based on the estimated motion. For example, the system may (try to) counteract the estimated motion of the optical imaging sensor by shifting the image data in the opposite direction. In other words, the system may be configured to shift the image data based on the estimated motion of the optical imaging sensor in order to adjust the image data, e.g. to counteract or compensate for the estimated motion of the optical imaging sensor. Accordingly, the system may be configured to (at least partially) compensate for (or at least counteract) the estimated motion of the optical imaging sensor within the adjusted image data. For example, the estimated motion of the optical imaging sensor may be counteracted or compensated for based on the offset that represents the group of similar offsets. In this context, the term "compensate for" might not indicate an unmitigated compensation for the estimated motion, but may allow for minute, uncompensated portions of the (undesired) motion of the optical imaging sensor.

In some embodiments, the motion of the optical imaging sensor may be estimated over a plurality of frames. If this is the case, as has been pointed out above, desired motion and undesired motion may be differentiated over the plurality of frames. Accordingly, the system may be configured to adjust the image data based on the estimated motion of the optical imaging sensor that is calculated over the plurality of frames. In general, the desired motion may be represented by the low-pass filtered estimated motion of the optical imaging sensor. Accordingly, the difference between the low-pass filtered estimated motion of the optical imaging sensor and the estimated motion of the optical imaging sensor may be deemed undesired motion of the optical imaging sensor. Consequently, the system may be configured to adjust the image data based on a difference between the estimated motion of the optical imaging sensor and the low-pass filtered estimated motion of the optical imaging sensor. In other words, the system may be configured to adjust the image data by compensating the undesired motion, while retaining the desired motion.

The interface 112 may correspond to one or more inputs and/or outputs for receiving and/or transmitting information, which may be in digital (bit) values according to a specified code, within a module, between modules or between modules of different entities. For example, the interface 112 may comprise interface circuitry configured to receive and/or transmit information. In embodiments the one or more processors 114 may be implemented using one or more processing units, one or more processing devices, any means for processing, such as a processor, a computer or a programmable hardware component being operable with accordingly adapted software. In other words, the described function of the one or more processors 114 may as well be implemented in software, which is then executed on one or more programmable hardware components. Such hardware components may comprise a general-purpose processor, a Digital Signal Processor (DSP), a micro-controller, etc. In at least some embodiments, the one or more storage devices 116 may comprise at least one element of the group of a computer readable storage medium, such as an magnetic or optical storage medium, e.g. a hard disk drive, a flash memory, Floppy-Disk, Random Access Memory (RAM), Programmable Read Only Memory (PROM), Erasable Programmable Read Only Memory (EPROM), an Electronically Erasable Programmable Read Only Memory (EEPROM), or a network storage.

More details and aspects of the system and microscope system are mentioned in connection with the proposed concept or one or more examples described above or below (e.g. FIGS. 2 to 7). The system and microscope system may comprise one or more additional optional features corresponding to one or more aspects of the proposed concept or one or more examples described above or below.

Figure 2:
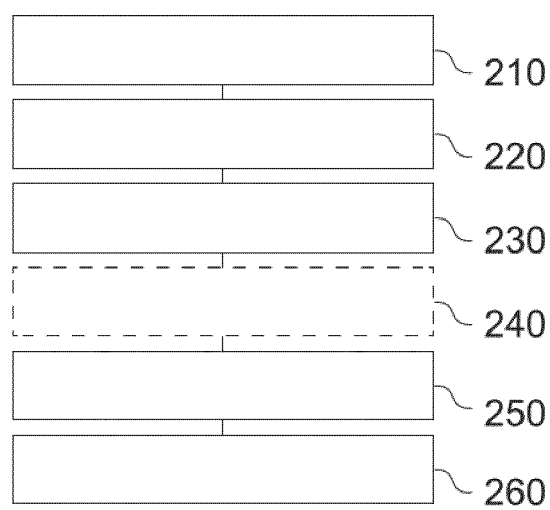
FIG. 2 shows a flow chart of an embodiment of a method for a microscope.

FIG. 2 shows a flow chart of an embodiment of a corresponding method for a microscope, e.g. for the microscope 120 or microscope system 100 of FIGS. 1a and/or 1b. The method comprises obtaining 210 image data from an optical imaging sensor of the microscope. The image data comprises at least a first frame and a subsequent second frame. The method comprises determining 220 a plurality of points of the first frame and a corresponding plurality of points of the second frame. In some embodiments, the plurality of points are selected from a portion of the image data showing an illuminated portion of the object. The method comprises determining 230 a plurality of offsets between the plurality of points of the first frame and the corresponding plurality of points of the second frame. In some embodiments, the method comprises determining 240 a group of similar offsets from the plurality of offsets. In this case, the method comprises estimating 250 a motion of the optical imaging sensor based on the group of similar offsets. In some embodiments, however, the motion of the optical imaging sensor is estimated 250 based on the plurality of offsets (without the offsets being grouped). The method comprises adjusting 260 the image data based on the estimated motion.

As indicated above, features described in connection with the system 110, the microscope 120 and the microscope system 100 of FIGS. 1a and/or 1b may be likewise applied to the method of FIG. 2.

More details and aspects of the method are mentioned in connection with the proposed concept or one or more examples described above or below (e.g. FIG. 1a to 1b, 3 to 7). The method may comprise one or more additional optional features corresponding to one or more aspects of the proposed concept or one or more examples described above or below.

At least some embodiments of the present disclosure relate to real-time video stabilization.

Figure 3:
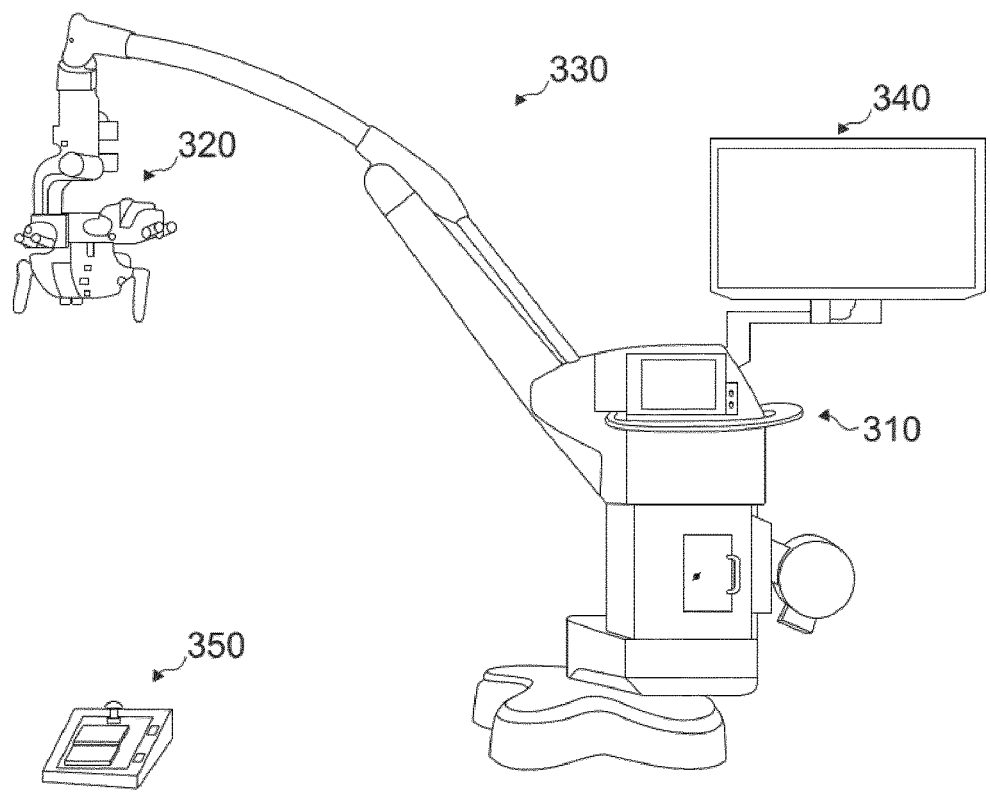
FIG. 3 shows a schematic drawing of a surgical microscope system.

FIG. 3 shows a schematic drawing of a surgical microscope system, which comprises a surgical microscope 320, that is also denoted Optical Carrier. The surgical microscope is attached to a base unit of the surgical microscope system by an arm 330, which maintains the surgical microscope above the patient during surgery. Processing of the image data generated by the surgical microscope 320, e.g. by an optical imaging sensor of the surgical microscope, is performed by a control system 310, which is housed in the base unit of the surgical microscope system. The surgical microscope can be controlled directly at the optical carrier, or via a foot controller 350. Image data that is generated by the surgical microscope can be viewed through ocular displays of the surgical microscope, or via an auxiliary display 340 that is attached to the base unit. Such surgical microscopes are, for example, used in neurosurgeries, either in a traditional manner or in a head-up operation mode. Also, such surgical microscope may be capable of providing an augmented reality experience.

As the optical carrier is carried by an arm, unintended vibrations of the optical carrier may occur (without motion compensation), which may yield vibrations in the resulting video. This may worsen the user experience. At the same time, such unintended vibrations may be difficult or expensive to remove mechanically.

In general, digital video stabilization may comprise three steps: 1) the motion of the camera is estimated, 2) the motion of the camera is smoothed and the vibrating component is removed, and 3) images in the video stream are transformed to compensate for the camera motion, resulting in a relatively steady scene. There are a variety of digital vibration reduction algorithms for consumer electronics, such as smartphones or digital cameras. These lack the capabilities for dealing with the key challenges of a complex camera motion, moving objects in the scene, the video possibly being out of focus, complex complex and changing textures, and particular lighting and reflections.

Embodiments of the present disclosure provide a fully digital real-time video stabilization for neurosurgical microscopes. The fully digital real-time video stabilization algorithm may be implemented in a digital image processing pipeline, which combines processing stages to improve the stability of a digital video stream under the presence of unwanted camera motion.

Figure 4:
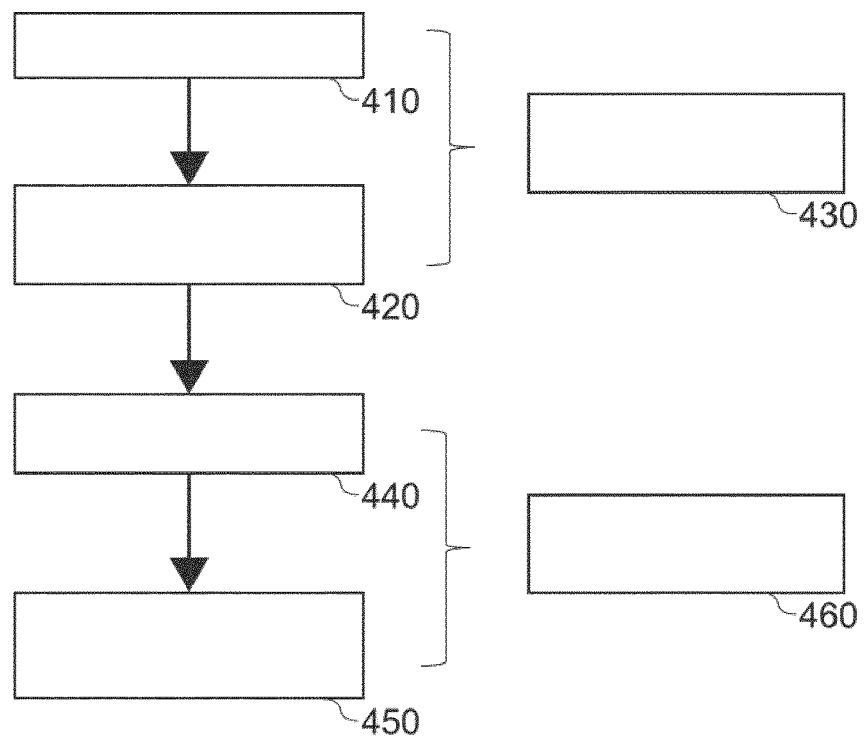
FIG. 4 shows a flow chart of an approach taken in various embodiments.

The video stabilization pipeline may be separated in four stages, as shown in FIG. 4. FIG. 4 shows a flow chart of an approach taken in various embodiments. The four stages may be:

Motion Estimation 410
Global Motion Extraction 420
(Optional) Motion Smoothing 440
Vibration Compensation 450

Motion Estimation and Global Motion Extraction may implement a Camera Motion Estimation 430, which may be performed as first step of the approach. Motion Smoothing and Vibration Compensation may Shift the Image 460, which may be performed as a second step of the approach.

Figure 5A:
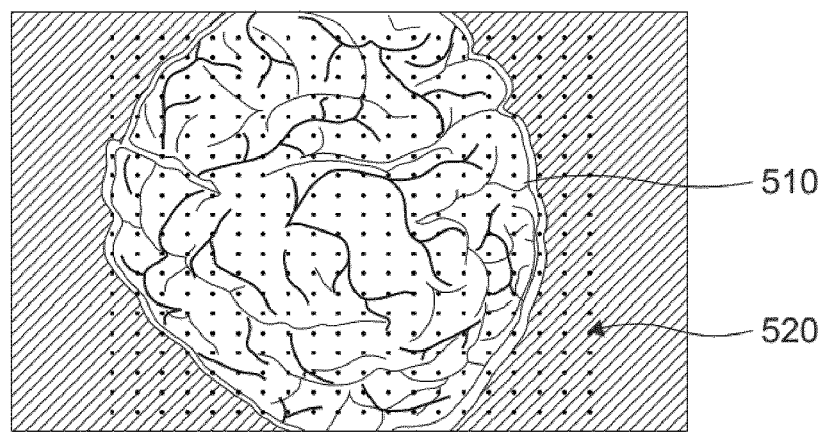
FIG. 5a shows a schematic drawing of points superimposed on image data of a brain.
Figure 5B:
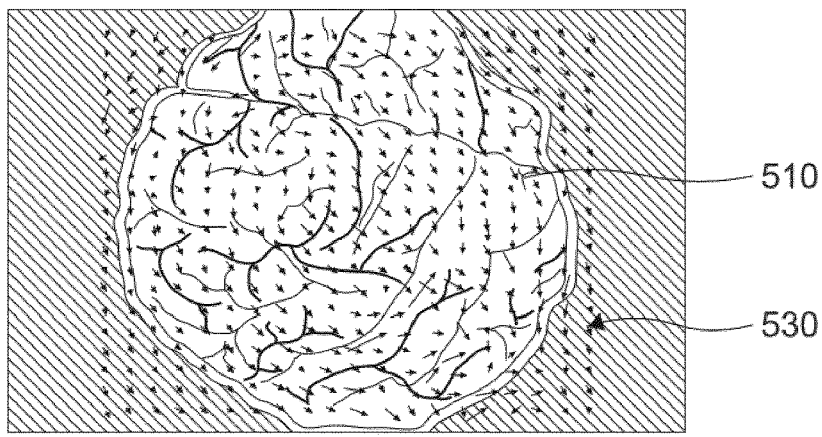
FIG. 5b shows a schematic drawing of motion vectors superimposed on image data of a brain.

The first step may be to estimate the relative motion between two consecutive frames of the digital video (i.e. the first and subsequent second frame of the image data, to estimate the motion of the optical imaging sensor). The approach is stated as follows: for a given pixel in the first frame (i.e. a point in the first frame), find the corresponding pixel in the next frame (i.e. the corresponding point in the second frame). FIG. 5a shows a schematic drawing of points 520 superimposed on image data of a brain 510. FIG. 5a may show a schematic representation of an image from the microscope and points at which velocity vectors are sampled. Taking a pixel at location $[x_1\ y_1]^T$ in the first frame, assuming the corresponding pixel in the next frame is located at $[x_2\ y_2]^T$, the vector $v=[x_1-x_2\ y_1-y_2]^T$ represents the motion between the two frames (i.e. the offset or motion vector between the point in the first frame and the corresponding point the second frame). This motion vector may be referred to as the velocity vector or offset, and may have a unit of pixel/frame. FIG. 5b shows a schematic drawing of motion vectors 530 superimposed on image data of the brain.

For example, the Lucas-Kanade optical flow algorithm (B. D. Lucas and T. Kanade, "An Iterative Image Registration Technique with an Application to Stereo Vision," *IJCAI*, 1981) may be used to compute the velocity vector for a given pixel in the frame. To stably track large motions, a multi-level pyramid technique may be used, as described in J. -y. Bouguet, "Pyramidal implementation of the Lucas Kanade feature tracker," Intel Corporation, 2001.

Embodiments may further perform velocity field sampling. Velocity vectors (i.e. motion vectors or offsets) at all (possible/tracked) pixel locations form the velocity field of the video. The velocity filed may be sampled at multiple locations and the resulting velocity vector samples may be used to determine the true global motion. Velocity field sampling provides the following benefits—it improve the accuracy of global motion extraction, it improves noise rejection, and it reduces a computation time.

The image acquired from the camera in the microscope often has a bright centre, and the brightness is often reduced as the distance to the centre of the frame increases (as can be seen in FIGS. 5a and 5b). This is a result of the property of the optics of the microscope.

In embodiments, the velocity field may be sampled at selected locations (i.e. the plurality of points of the first or second frame may be sampled at selected locations), which may be equally spaced in a rectangular region covering the central bright region of the frame. The distribution of the locations where the samples are taken is illustrated in FIG. 5a, and the sample locations are marked with dots. The sample locations may be arranged in a rectangular grid with equal pitch in both directions. The size of the rectangular region may be adjusted to match the actual size of the central bright region of the frame, and the pitch of the rectangular grid may be reduced or minimized given the constraint that the total computation time of the algorithm does not exceed the execution time allocated to this algorithm. The Lucak-Kanade optical flow algorithm may be applied to each sample location, resulting in one velocity vector per sample location.

Embodiments may further perform global motion extraction. For example, the sampled velocity vectors obtained in the previous step may be used to determine the global motion (i.e. the estimated motion of the optical imaging sensor). For example, the Density-Based Spatial Clustering for Applications with Noise (DBSCAN) algorithm (M. Ester, K. Hans-Peter, S. Jorg and X. Xu, "A density-based algorithm for discovering clusters a density-based algorithm for discovering clusters in large spatial databases with noise," *KDD'96 Proceedings of the Second International Conference on Knowledge Discovery and Data Mining*, pp. 226-231, 1996.) may be used to extract the global motion from the samples.

As a pre-processing step, a brute-force neighbour search algorithm may be applied to the velocity vectors. Two velocity vectors may be considered neighbours of each other, if the difference between them is smaller than a threshold $\epsilon$, where the difference between two velocity vectors is defined as $$d_{ij}=d_{ji}=\|v_i-v_j\|$$

, in which $v_i$ and $v_j$ are the velocity vectors, $d_{ij}=d_{ji}$ is the distance between them, and $\|x\|=\sqrt{x^T x}$ denotes the L2 norm of any vector x. The brute-force neighbour search may exhaustively compute the differences between (all) possible sample pairs and determine the neighbour lists of every sample. This algorithm has a complexity of $O(n^2)$, but is faster for a small number of samples, which makes it suitable for this application. The threshold $\epsilon$ may be determined experimentally.

The neighbour lists may then be processed by the DBSCAN algorithm. The DBSCAN algorithm classifies the velocity vector samples as follows:
- If a sample has no neighbour, it is assigned to the noise class.
- If a sample has one or more neighbours, it is assigned to the same class as its neighbours.
- If a sample has more than $N_{min}$ neighbours, it is considered a "core point" of the class, where the threshold $N_{min}$ is a parameter given to the algorithm, and may be determined experimentally.

The DBSCAN algorithm may provide several advantages. First, it effectively models and classifies noise and the criterion of noise is intuitively captured by the threshold $\epsilon$. Second, it does not require any prior knowledge on the number of classes that the dataset contains, instead it figures out how many classes are needed.

Figure 5C:
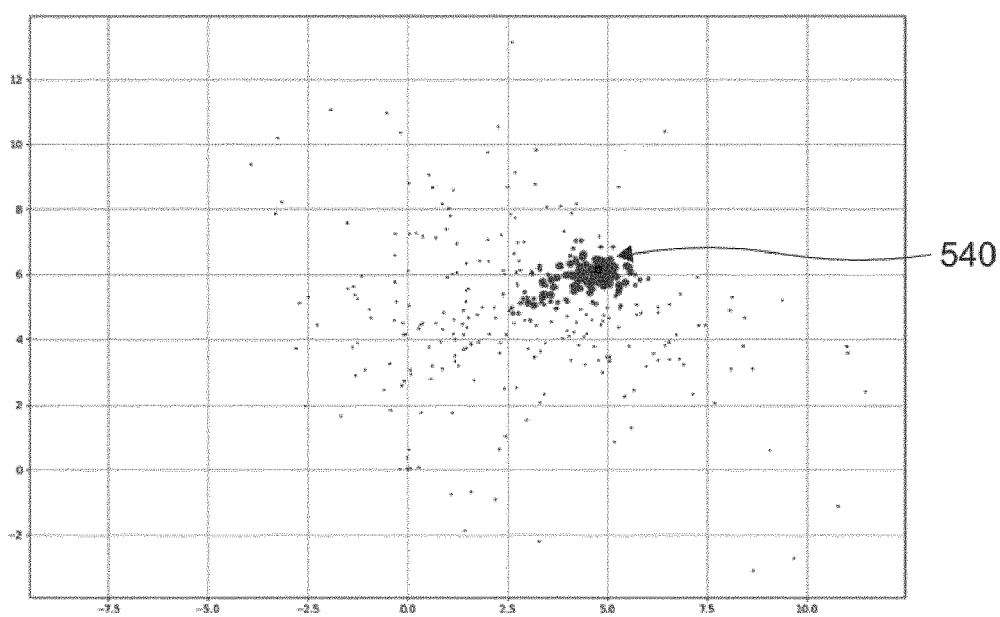
FIG. 5c shows a plot of a distribution of motion vectors according to an example.

The global velocity vector, $v_g$ (i.e. the offset representing the group of similar offsets), may be computed as the average value of velocity vector samples that are the core points of most populous non-noise class (i.e. the group of similar offsets) given by the DBSCAN algorithm. If all samples are assigned to the noise class, $v_g$ is a zero vector. FIG. 5c shows a typical classification result of the algorithm.

Figure 5D:
FIG. 5d shows a plot of a distribution of motion vectors according to another example, wherein two subsets of the motion vectors are assigned to groups or clusters of motion vectors.

FIG. 5c shows a plot of a distribution of motion vectors according to an example. FIG. 5c shows a DBSCAN classification of velocity vector samples. In FIG. 5c, the core points 540 are shown with a larger shape, adjacent, slightly smaller points are non-core points, and little points that do not belong to the cluster are noise. In FIG. 5c, the x-axis shows the x-velocity (pixels/frame), and the y-axis shows the y-velocity (pixels/frame). FIG. 5d shows a plot of a distribution of motion vectors according to another example, wherein two subsets 540a and 540b of the motion vectors are assigned to groups or clusters of motion vectors;

The global motion vector, $x_g$ (i.e. the estimated motion), may be obtained by numerically integrating $v_g$:

$$x_g(0)=[0,0]^T$$

$$x_g(k)=x_g(k-1)+v_g(k)$$

Various embodiments of the present disclosure further provide motion smoothing. In other words, the system may perform motion smoothing on the estimated motion of the optical imaging sensor. Let $x_g$ be the global motion vector estimated from the raw video frames from the camera, and $\tilde{x}_g$ be the desired global motion vector after video stabilization. When the camera in the microscope undergoes unwanted disturbance, $x_g$ also exhibits large oscillation. However, the stabilized motion vector $\tilde{x}_g$ may be desired to stay relatively unchanged to improve the viewing experience. In general, the unwanted oscillations of the camera have frequency components higher than 0.5 Hz. Accordingly, a first-order low-pass filter may be applied to estimate $\tilde{x}_g$ from $x_g$:

$$\tilde{x}_g(0) = x_g(0)$$

$$\tilde{x}_g(k) = (1-\beta)\tilde{x}_g(k-1) + \beta x_g(k)$$

The filter strength $\beta$ may be determined experimentally.

Figure 6A:
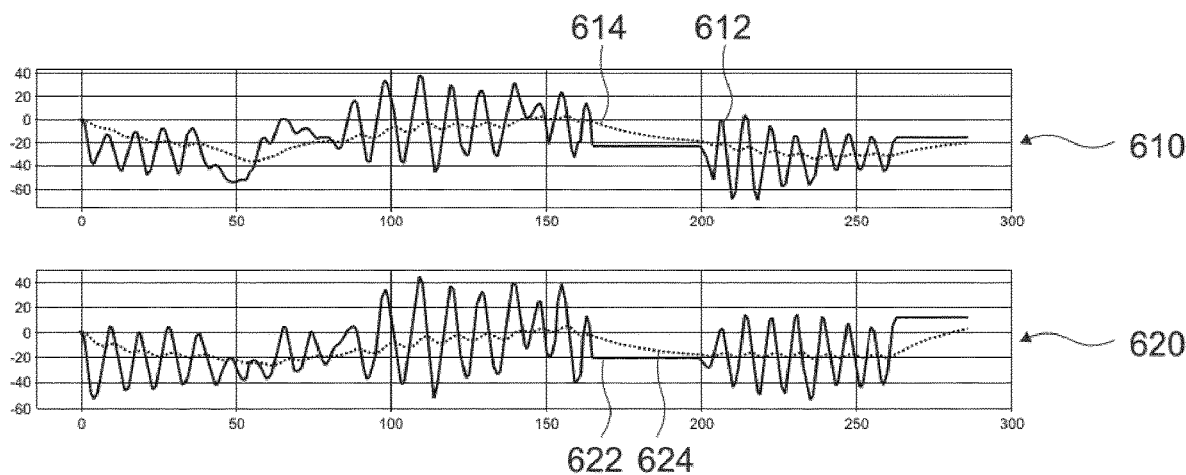
FIG. 6a shows a diagram showing low-pass-filtered motion vs. non low-pass-filtered motion in an example having a small amplitude of motion.
Figure 6B:
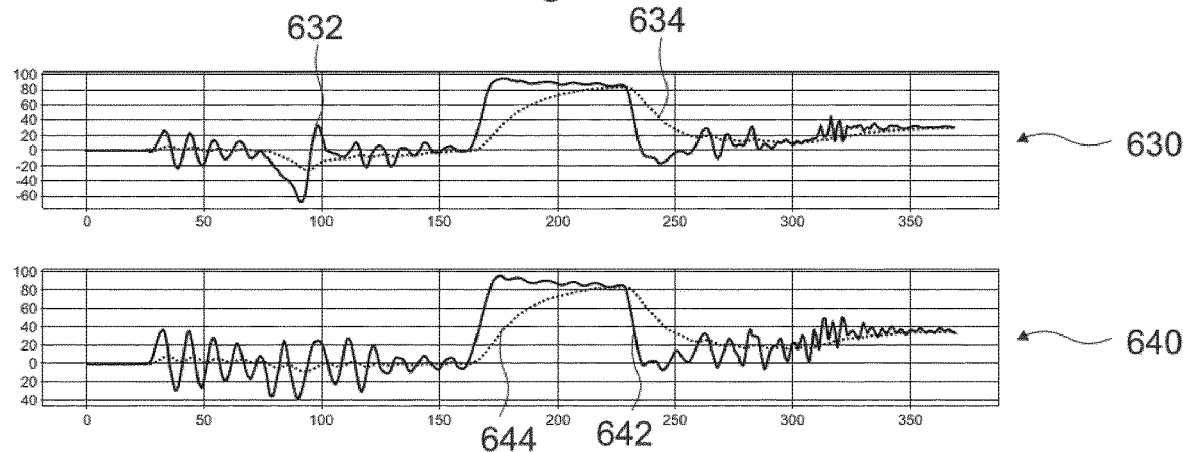
FIG. 6b shows a diagram showing low-pass-filtered motion vs. non low-pass-filtered motion in an example having a large amplitude of motion.

FIG. 6a shows a diagram showing low-pass-filtered motion 614; 624 (e.g. a desired motion) vs. the non-low-pass-filtered motion 612; 622 (e.g. an actual camera motion) in an example having a small amplitude of motion. In FIG. 6a, on the top 610, the x-motion is shown, and on the bottom 620, the y-motion is shown, with the x-axis showing the time, and the y-axis showing a number of pixels. FIG. 6b shows a diagram showing low-pass-filtered motion 634; 644 (e.g. a desired motion) vs. the non-low-pass-filtered motion 632; 642 (e.g. an actual camera motion) in an example having a large amplitude of motion. In FIG. 6a, on the top 630, the x-motion is shown, and on the bottom 640, the y-motion is shown, with the x-axis showing the time, and the y-axis showing a number of pixels.

At least some embodiments further provide vibration compensation. The smoothed motion may be used to compensate for the unwanted motion in the raw video, resulting in a vibration-free (or at least vibration-reduced), stable video. A simple affine transform with only linear shifts may be used to transform each raw frame into a compensated frame. The affine transformation matrix may be given by:

$$M_A(k) = \begin{bmatrix} 1 & 0 & d_x(k) \\ 0 & 1 & d_y(k) \\ 0 & 0 & 1 \end{bmatrix}$$

where $[d_x(k)\ d_y(k)]^T = x_g(k) - \tilde{x}_g(k)$ is the difference between the true and the smoothed global motion vectors.

The pixel value at location $[\tilde{x}\ \tilde{y}]^T$ in the compensated frame may be set to the pixel value at location $[x\ y]^T$ in the raw frame, where $$\begin{bmatrix} x \\ y \\ 1 \end{bmatrix} = M_A \begin{bmatrix} \tilde{x} \\ \tilde{y} \\ 1 \end{bmatrix}$$

In case x and/or y are not integers, bilinear interpolation may be used to obtain an interpolated pixel values from the four pixels the nearest to $[x\ y]^T$.

Embodiments of the present disclosure may thus provide digital real-time video stabilization for neurosurgical microscopes. The video stabilization is based on the calculation of motion vectors, which is in turn based on a detection of points in an image frame, and a tracking of a movement of these points across one or more subsequent image frames. Due to the tracking of the individual points, fingers may also be tracked, but discarded from the motion estimation. This may be done using a process called "Global Motion Extraction", which is based on grouping the offsets into groups, e.g. using the DBSCAN algorithm. For example, the "Global Motion Extraction", e.g. the DBSCAN algorithm, may be a form of Unsupervised Machine Learning. A first-order Low-pass Filter may be used for motion smoothing. For example, the OC (Optical Carrier, the actual surgical microscope) should either be stationary or move slowly. Undesired vibrations result from quick motions.

The approach introduced in the present disclosure provides digital video stabilization in real-time, with intended motion in the scene being preserved. At the same time, no additional hardware (i.e. no additional hardware vibration compensation) may be required, and a reduced requirement for mechanical damping may be enabled.

Embodiments may use motion sampling in a selected region of interest. The optical flow may effectively estimate local motion, even in low-texture regions. The DBSCAN algorithm may effectively extract global motion and rejects noise. Embodiments may thus provide motion field estimation and sampling. The video stabilization was tested on live video of a microscope, where more than 20 frames/second were achieved on a desktop-class processor.

Figure 7:
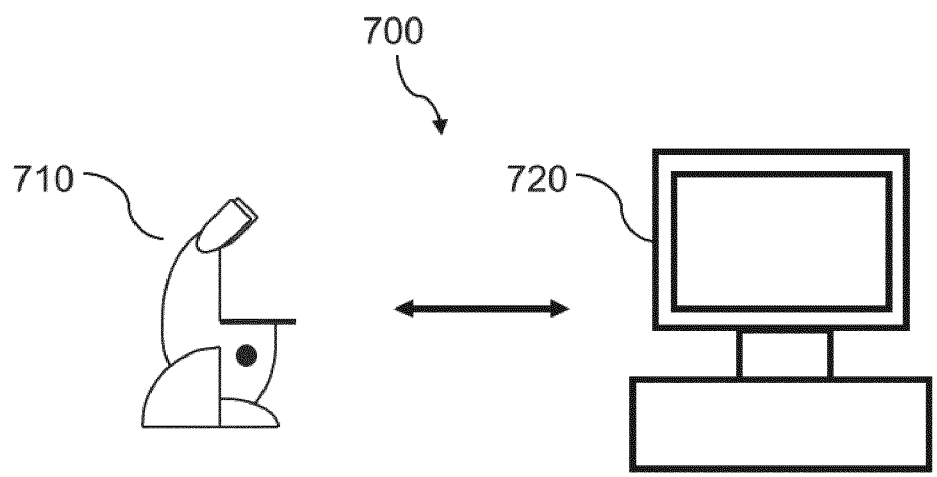
FIG. 7 shows a schematic diagram of a microscope system comprising a microscope and a computer system.

FIG. 7 shows a schematic diagram of a microscope system comprising a microscope and a computer system. Some embodiments relate to a microscope comprising a system as described in connection with one or more of the FIGS. 1a to 6. Alternatively, a microscope may be part of or connected to a system as described in connection with one or more of the FIGS. 1a to 6. FIG. 7 shows a schematic illustration of a system 700 configured to perform a method described herein. The system 700 comprises a microscope 710 and a computer system 720. The microscope 710 is configured to take images and is connected to the computer system 720. The computer system 720 is configured to execute at least a part of a method described herein. The computer system 720 may be configured to execute a machine learning algorithm. The computer system 720 and microscope 710 may be separate entities but can also be integrated together in one common housing. The computer system 720 may be part of a central processing system of the microscope 710 and/or the computer system 720 may be part of a subcomponent of the microscope 710, such as a sensor, an actor, a camera or an illumination unit, etc. of the microscope 710.

The computer system 720 may be a local computer device (e.g. personal computer, laptop, tablet computer or mobile phone) with one or more processors and one or more storage devices or may be a distributed computer system (e.g. a cloud computing system with one or more processors and one or more storage devices distributed at various locations, for example, at a local client and/or one or more remote server farms and/or data centers). The computer system 720 may comprise any circuit or combination of circuits. In one embodiment, the computer system 720 may include one or more processors which can be of any type. As used herein, processor may mean any type of computational circuit, such as but not limited to a microprocessor, a microcontroller, a complex instruction set computing (CISC) microprocessor, a reduced instruction set computing (RISC) microprocessor, a very long instruction word (VLIW) microprocessor, a graphics processor, a digital signal processor (DSP), multiple core processor, a field programmable gate array (FPGA), for example, of a microscope or a microscope component (e.g. camera) or any other type of processor or processing circuit. Other types of circuits that may be included in the computer system 720 may be a custom circuit, an application-specific integrated circuit (ASIC), or the like, such as, for example, one or more circuits (such as a communication circuit) for use in wireless devices like mobile telephones, tablet computers, laptop computers, two-way radios, and similar electronic systems. The computer system 720 may include one or more storage devices, which may include one or more memory elements suitable to the particular application, such as a main memory in the form of random access memory (RAM), one or more hard drives, and/or one or more drives that handle removable media such as compact disks (CD), flash memory cards, digital video disk (DVD), and the like. The computer system 720 may also include a display device, one or more speakers, and a keyboard and/or controller, which can include a mouse, trackball, touch screen, voice-recognition device, or any other device that permits a system user to input information into and receive information from the computer system 720.

Some or all of the method steps may be executed by (or using) a hardware apparatus, like for example, a processor, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a non-transitory storage medium such as a digital storage medium, for example a floppy disc, a DVD, a Blu-Ray, a CD, a ROM, a PROM, and EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may, for example, be stored on a machine readable carrier.

Other embodiments comprise the computer program for performing one of the methods described herein, stored on a machine readable carrier.

In other words, an embodiment of the present invention is, therefore, a computer program having a program code for performing one of the methods described herein, when the computer program runs on a computer.

A further embodiment of the present invention is, therefore, a storage medium (or a data carrier, or a computer-readable medium) comprising, stored thereon, the computer program for performing one of the methods described herein when it is performed by a processor. The data carrier, the digital storage medium or the recorded medium are typically tangible and/or non-transitionary. A further embodiment of the present invention is an apparatus as described herein comprising a processor and the storage medium.

A further embodiment of the invention is, therefore, a data stream or a sequence of signals representing the computer program for performing one of the methods described herein. The data stream or the sequence of signals may, for example, be configured to be transferred via a data communication connection, for example, via the internet.

A further embodiment comprises a processing means, for example, a computer or a programmable logic device, configured to, or adapted to, perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example, a field programmable gate array) may be used to perform some or all of the functionalities of the methods described herein. In some embodiments, a field programmable gate array may cooperate with a micro-processor in order to perform one of the methods described herein. Generally, the methods are preferably performed by any hardware apparatus.

Embodiments may be based on using a machine-learning model or machine-learning algorithm. Machine learning may refer to algorithms and statistical models that computer systems may use to perform a specific task without using explicit instructions, instead relying on models and inference. For example, in machine-learning, instead of a rule-based transformation of data, a transformation of data may be used, that is inferred from an analysis of historical and/or training data. For example, the content of images may be analyzed using a machine-learning model or using a machine-learning algorithm. In order for the machine-learning model to analyze the content of an image, the machine-learning model may be trained using training images as input and training content information as output. By training the machine-learning model with a large number of training images and/or training sequences (e.g. words or sentences) and associated training content information (e.g. labels or annotations), the machine-learning model "learns" to recognize the content of the images, so the content of images that are not included in the training data can be recognized using the machine-learning model. The same principle may be used for other kinds of sensor data as well: By training a machine-learning model using training sensor data and a desired output, the machine-learning model "learns" a transformation between the sensor data and the output, which can be used to provide an output based on non-training sensor data provided to the machine-learning model. The provided data (e.g. sensor data, meta data and/or image data) may be preprocessed to obtain a feature vector, which is used as input to the machine-learning model.

Machine-learning models may be trained using training input data. The examples specified above use a training method called "supervised learning". In supervised learning, the machine-learning model is trained using a plurality of training samples, wherein each sample may comprise a plurality of input data values, and a plurality of desired output values, i.e. each training sample is associated with a desired output value. By specifying both training samples and desired output values, the machine-learning model "learns" which output value to provide based on an input sample that is similar to the samples provided during the training. Apart from supervised learning, semi-supervised learning may be used. In semi-supervised learning, some of the training samples lack a corresponding desired output value. Supervised learning may be based on a supervised learning algorithm (e.g. a classification algorithm, a regression algorithm or a similarity learning algorithm. Classification algorithms may be used when the outputs are restricted to a limited set of values (categorical variables), i.e. the input is classified to one of the limited set of values. Regression algorithms may be used when the outputs may have any numerical value (within a range). Similarity learning algorithms may be similar to both classification and regression algorithms but are based on learning from examples using a similarity function that measures how similar or related two objects are. Apart from supervised or semi-supervised learning, unsupervised learning may be used to train the machine-learning model. In unsupervised learning, (only) input data might be supplied and an unsupervised learning algorithm may be used to find structure in the input data (e.g. by grouping or clustering the input data, finding commonalities in the data). Clustering is the assignment of input data comprising a plurality of input values into subsets (clusters) so that input values within the same cluster are similar according to one or more (pre-defined) similarity criteria, while being dissimilar to input values that are included in other clusters.

Reinforcement learning is a third group of machine-learning algorithms. In other words, reinforcement learning may be used to train the machine-learning model. In reinforcement learning, one or more software actors (called "software agents") are trained to take actions in an environment. Based on the taken actions, a reward is calculated. Reinforcement learning is based on training the one or more software agents to choose the actions such, that the cumulative reward is increased, leading to software agents that become better at the task they are given (as evidenced by increasing rewards).

Furthermore, some techniques may be applied to some of the machine-learning algorithms. For example, feature learning may be used. In other words, the machine-learning model may at least partially be trained using feature learning, and/or the machine-learning algorithm may comprise a feature learning component. Feature learning algorithms, which may be called representation learning algorithms, may preserve the information in their input but also transform it in a way that makes it useful, often as a pre-processing step before performing classification or predictions. Feature learning may be based on principal components analysis or cluster analysis, for example.

In some examples, anomaly detection (i.e. outlier detection) may be used, which is aimed at providing an identification of input values that raise suspicions by differing significantly from the majority of input or training data. In other words, the machine-learning model may at least partially be trained using anomaly detection, and/or the machine-learning algorithm may comprise an anomaly detection component.

In some examples, the machine-learning algorithm may use a decision tree as a predictive model. In other words, the machine-learning model may be based on a decision tree. In a decision tree, observations about an item (e.g. a set of input values) may be represented by the branches of the decision tree, and an output value corresponding to the item may be represented by the leaves of the decision tree. Decision trees may support both discrete values and continuous values as output values. If discrete values are used, the decision tree may be denoted a classification tree, if continuous values are used, the decision tree may be denoted a regression tree.

Association rules are a further technique that may be used in machine-learning algorithms. In other words, the machine-learning model may be based on one or more association rules. Association rules are created by identifying relationships between variables in large amounts of data. The machine-learning algorithm may identify and/or utilize one or more relational rules that represent the knowledge that is derived from the data. The rules may e.g. be used to store, manipulate or apply the knowledge.

Machine-learning algorithms are usually based on a machine-learning model. In other words, the term "machine-learning algorithm" may denote a set of instructions that may be used to create, train or use a machine-learning model. The term "machine-learning model" may denote a data structure and/or set of rules that represents the learned knowledge (e.g. based on the training performed by the machine-learning algorithm). In embodiments, the usage of a machine-learning algorithm may imply the usage of an underlying machine-learning model (or of a plurality of underlying machine-learning models). The usage of a machine-learning model may imply that the machine-learning model and/or the data structure/set of rules that is the machine-learning model is trained by a machine-learning algorithm.

For example, the machine-learning model may be an artificial neural network (ANN). ANNs are systems that are inspired by biological neural networks, such as can be found in a retina or a brain. ANNs comprise a plurality of interconnected nodes and a plurality of connections, so-called edges, between the nodes. There are usually three types of nodes, input nodes that receiving input values, hidden nodes that are (only) connected to other nodes, and output nodes that provide output values. Each node may represent an artificial neuron. Each edge may transmit information, from one node to another. The output of a node may be defined as a (non-linear) function of its inputs (e.g. of the sum of its inputs). The inputs of a node may be used in the function based on a "weight" of the edge or of the node that provides the input. The weight of nodes and/or of edges may be adjusted in the learning process. In other words, the training of an artificial neural network may comprise adjusting the weights of the nodes and/or edges of the artificial neural network, i.e. to achieve a desired output for a given input.

Alternatively, the machine-learning model may be a support vector machine, a random forest model or a gradient boosting model. Support vector machines (i.e. support vector networks) are supervised learning models with associated learning algorithms that may be used to analyze data (e.g. in classification or regression analysis). Support vector machines may be trained by providing an input with a plurality of training input values that belong to one of two categories. The support vector machine may be trained to assign a new input value to one of the two categories. Alternatively, the machine-learning model may be a Bayesian network, which is a probabilistic directed acyclic graphical model. A Bayesian network may represent a set of random variables and their conditional dependencies using a directed acyclic graph. Alternatively, the machine-learning model may be based on a genetic algorithm, which is a search algorithm and heuristic technique that mimics the process of natural selection.

As used herein the term "and/or" includes any and all combinations of one or more of the associated listed items and may be abbreviated as "/".

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

LIST OF REFERENCE SIGNS

100 Microscope system
105 Base unit
110 System
112 Interface

114 One or more processors
116 One or more storage devices
120 Microscope
122 Optical imaging sensor
130 Display
140 Arm
150 Steering handles
210 Obtaining image data
220 Determining a plurality of points
230 Determining a plurality of offsets
240 Determining a group of similar offsets
250 Estimating a motion
260 Adjusting the image data
310 Control system
320 Surgical microscope
330 Arm
340 Auxiliary display
350 Foot controller
410 Motion Estimation
420 Global Motion Extraction
430 Camera Motion Estimation
440 Motion Smoothing
450 Vibration Compensation
460 Shift Image
510 Brain
520 Points
530 Motion vectors
540 Core points
610 Motion in x-direction
612 Non low-pass-filtered motion in x-direction
614 Low-pass-filtered motion in x-direction
620 Motion in y-direction
622 Non low-pass-filtered motion in y-direction
624 Low-pass-filtered motion in y-direction
630 Motion in x-direction
632 Non low-pass-filtered motion in x-direction
634 Low-pass-filtered motion in x-direction
640 Motion in y-direction
642 Non low-pass-filtered motion in y-direction
644 Low-pass-filtered motion in y-direction
700 Microscope system
710 Microscope
720 Computer system

The invention claimed is:

1. A system for a microscope, the system comprising one or more processors and one or more storage devices, wherein the system is configured to:
obtain image data from an optical imaging sensor of the microscope, the image data comprising at least a first frame and a subsequent second frame;
determine a plurality of points of the first frame and a corresponding plurality of points of the second frame;
determine a plurality of offsets between the plurality of points of the first frame and the corresponding plurality of points of the second frame;
determine a group of similar offsets from the plurality of offsets;
estimate a motion of the optical imaging sensor based on the group of similar off-sets; and
adjust the image data based on the estimated motion.

2. The system according to claim 1, wherein the system is configured to cluster the plurality of offsets into a plurality of groups of offsets using a clustering algorithm, such that each group of offsets comprises one or more offsets that are similar ac-cording to a similarity criterion, and to determine the group of similar offsets among the plurality of groups of offsets.

3. The system according to claim 2, wherein the system is configured to determine the group of similar offsets by selecting a group of offsets of the plurality of offsets being larger than other groups of offsets of the plurality of groups of offsets.

4. The system according to claim 2, wherein the clustering algorithm is one of a gaussian mixture algorithm and a density-based spatial clustering algorithm.

5. The system according to claim 2, wherein the system is configured to determine an offset that represents the group of similar offsets, and to adjust the image data based on the determined offset.

6. The system according to claim 1, wherein the system is configured to compensate for the estimated motion of the optical imaging sensor within the adjusted image data.

7. The system according to claim 1, wherein the system is configured to obtain the image data over a plurality of frames of the image data, and to estimate the motion of the optical imaging sensor over the plurality of the frames, wherein the system is configured to adjust the image data based on the estimated motion of the optical imaging sensor that is calculated over the plurality of frames.

8. The system according to claim 7, wherein the system is configured to low-pass filter the estimated motion of the optical imaging sensor over the plurality of frames, and to adjust the image data based on the low-pass filtered estimated motion of the optical imaging sensor, wherein the system is configured to adjust the image data based on a difference between the estimated motion of the optical imaging sensor and the low-pass filtered estimated motion of the optical imaging sensor.

9. The system according to claim 1, wherein the plurality of points are selected from a portion of the image data showing an illuminated portion of an object being shown in the image data.

10. The system according to claim 1, wherein the microscope is a surgical microscope, wherein an object being shown in the image data is a sample of organic tissue of a patient.

11. A microscope system comprising the microscope and the system according claim 1.

12. A system for a microscope, the system comprising one or more processors and one or more storage devices, wherein the system is configured to:
obtain image data from an optical imaging sensor of the microscope, the image da-ta comprising at least a first frame and a subsequent second frame;
determine a plurality of points of the first frame and a corresponding plurality of points of the second frame, wherein the plurality of points are selected from a portion of the image data showing an illuminated portion of object being shown in the image data,
determine a plurality of offsets between the plurality of points of the first frame and the corresponding plurality of points of the second frame;
estimate a motion of the optical imaging sensor based on the plurality of offsets; and
adjust the image data based on the estimated motion.

13. A microscope system comprising the microscope and the system according to claim 12.

14. A method for a microscope, the method comprising:
obtaining image data from an optical imaging sensor of the microscope, the image data comprising at least a first frame and a subsequent second frame;

determining a plurality of points of the first frame and a corresponding plurality of points of the second frame, wherein the plurality of points are selected from a portion of the image data showing an illuminated portion of an object being shown in the image data, determining a plurality of offsets between the plurality of points of the first frame and the corresponding plurality of points of the second frame;

estimating a motion of the optical imaging sensor based on the plurality of offsets; and adjusting the image data based on the estimated motion.

15. A non-transitory, computer-readable medium comprising a program code that, when the program code is executed on a processor, a computer, or a programmable hardware component, causes the processor, computer, or programmable hardware component to perform the method of claim 14.

* * * * *